Dec. 31, 1963   C. W. FISTER ETAL   3,115,895
LEAKPROOF DUAL VALVE
Filed Feb. 28, 1963                           2 Sheets-Sheet 1

INVENTORS
CHARLES W. FISTER
CLEMENT J. TURANSKY
BY
ATTORNEYS

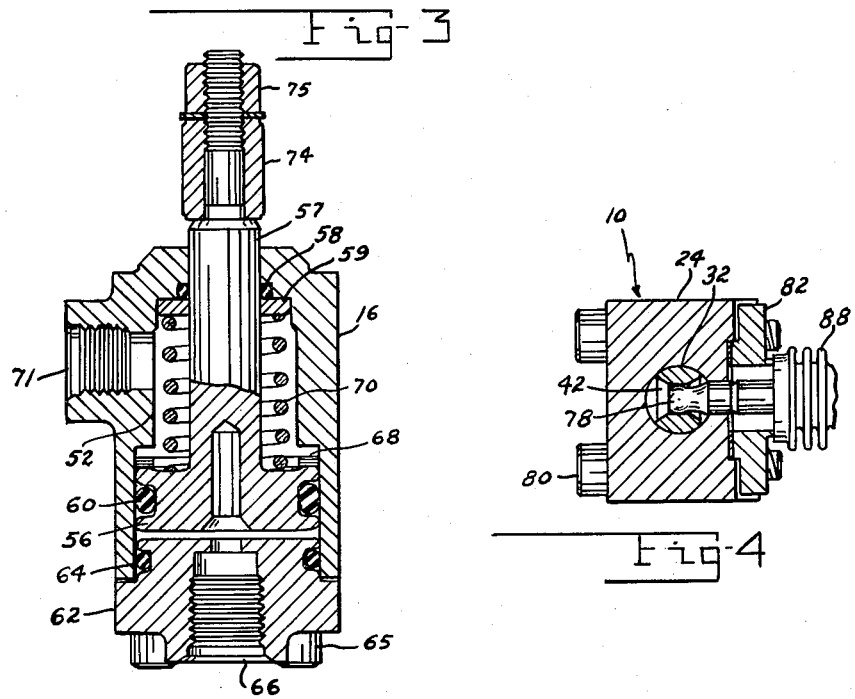
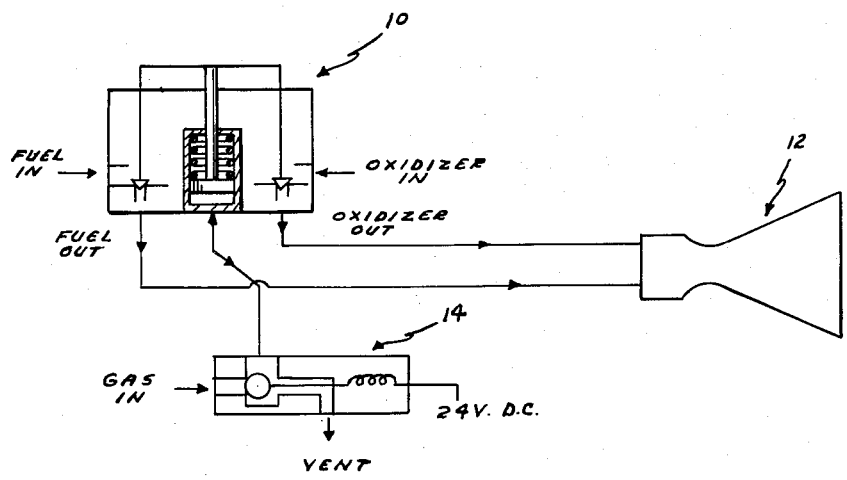

United States Patent Office 3,115,895
Patented Dec. 31, 1963

3,115,895
LEAKPROOF DUAL VALVE
Charles W. Fister, Cheektowaga, and Clement J. Turansky, Tonawanda, N.Y., assignors to the United States of America as represented by the Secretary of the Air Force
Filed Feb. 28, 1963, Ser. No. 261,915
4 Claims. (Cl. 137—595)

This invention relates to dual valves adapted to simultaneously meter two fluids or gases. More specifically, this invention relates to such a dual valve for regulating the flow of liquid fuel and oxidizer into the combustion section of a liquid fuel rocket engine.

The dual valve of the present invention is similar to the dual valve shown on copending application for Rocket Liquid Fuel System and Valve Control, Serial Number 150,850 filed November 7, 1961. Likewise the dual valve of the present invention may be used in the fuel system shown on FIG. 1 of the copending application.

The liquid fuel and oxidizer passing through the dual valve of this invention produce combustion on contact with each other. It is, therefore, obvious that they are extremely dangerous materials and must be handled with the utmost caution. Utmost safety measures must be exercised, and the handling equipment must be designed to minimize the possibility of leakage.

The primary object of the present invention is to produce a dual valve which is leakproof.

Another object of the present invention is to eliminate sliding seals through which the fluids being metered can escape into the atmosphere.

Additional objects, advantages and features of the invention reside in the construction, arrangement and combination of parts involved in the embodiment of the invention as will appear from the following description and accompanying drawings, wherein:

FIG. 3 is a vertical cross section taken on line 3—3 of FIG. 2;

FIG. 4 is a plan section taken on line 4—4 of FIG. 2; and

FIG. 5 is a schematic drawing illustrating the application of the dual valve in the fuel system of a liquid fuel rocket engine.

Referring to FIG. 5, the dual valve, referred to hereafter as valve 10, is operationally shown in the schematic fuel system supplying fuel and oxidizer to the combustion section of rocket engine 12. The entire fuel system may be such as disclosed in the referenced copending application, or the supply of fuel and oxidizer may be in pressurized tanks, each appropriately connected to valve 10 as indicated. Joined to valve 10 is a solenoid operated valve 14 for controlling the gas powering the actuating piston in valve 10 which opens and closes the fuel and oxidizer valves. The gas may be any convenient source such as, for example, bottled nitrogen. Upon command, through the 24 volt circuit shown, the solenoid valve opens to admit gas to the actuating cylinder while at the same time the vent port in the solenoid valve is closed. Upon interruption of the 24 volt circuit, the solenoid valve closes to the position shown; permitting the actuating gas to vent from the actuating cylinder in valve 10 and causing the fuel and oxidizer valves to close to the position shown.

Figure 1:
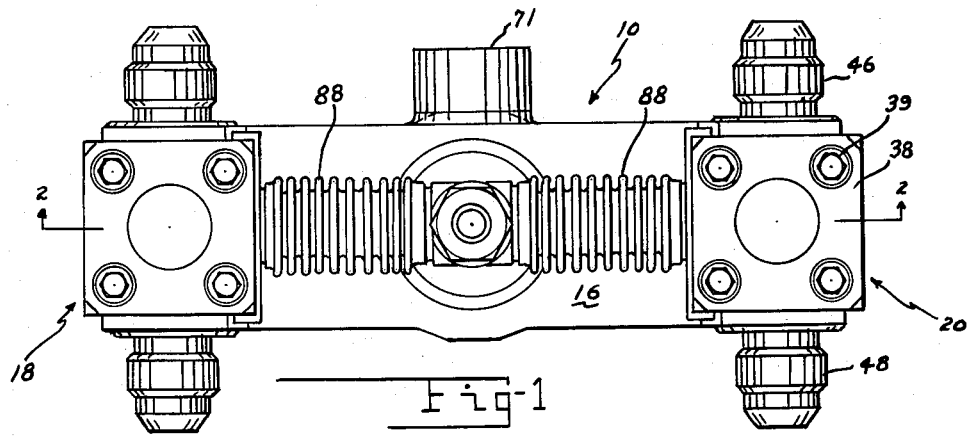
FIG. 1 is a plan view of the dual valve.
Figure 2:
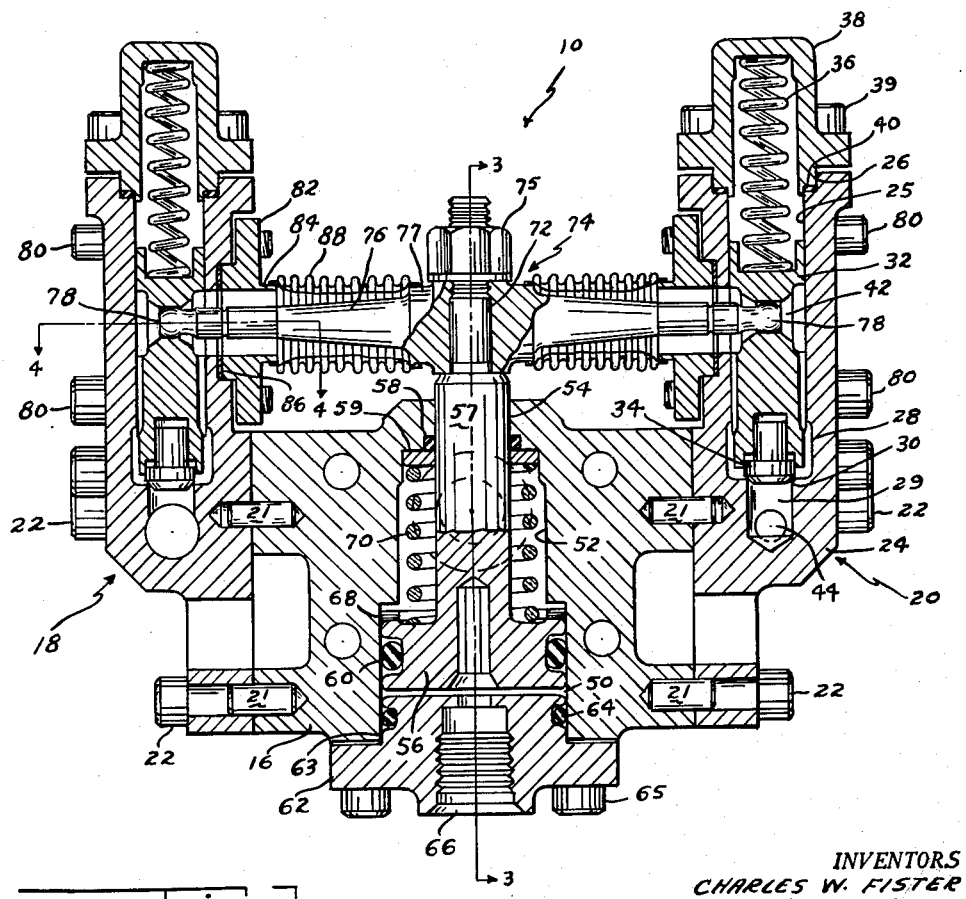
FIG. 2 is a vertical cross section of the valve taken on line 2—2 of FIG. 1.

Referring to FIG. 1 and FIG. 2, dual valve 10 has an actuator cylinder housing 16, a first or fuel valve 18, and a second or oxidizer valve 20. The fuel valve 18 and the oxidizer valve 20 are both poppet valves and are located and vertically mounted on symmetrically opposite sides of the actuator cylinder housing 16 by means of dowel pins 21 and screws 22 in a manner causing the movement of the valve plugs to be parallel with the axial movement of the piston in the actuator cylinder housing. The fuel valve and the oxidizer valve may be of identical size and characteristics; or if necessary to meet design requirements, the various elements may be of different sizes. Since the two valves are shown with like elements, only the second or oxidizer valve 20 will be described in detail.

The oxidizer valve 20 has a body 24 containing a vertical bore 25 having a counterbore 26 at the open top end and terminating at the lower end in a chamber 28. Coaxial with bore 25 and extending below chamber 28 is a reduced diameter passage 29, the junction between chamber 28 and passage 29 forming valve seat 30. Axially slidable within bore 25 is plug guide 32 supporting at its lower end a valve plug 34 for opening from and closing against valve seat 30. Biasing the valve plug against the valve seat is a compression spring 36 bearing against the upper end of plug guide 32 and retained by end cap 38 joined to body 24 by means of screws 39. In the bottom of counterbore 26 of body 24 is a gasket 40 providing a seal between the body and the end cap. Transversely through the center of plug guide 32, and as also shown on FIG. 4, is a circular passage 42 for a purpose to be hereinafter described.

Communicating with passage 29 is a transverse passage 44 which terminates in the threaded tubing connection 46 shown on FIG. 1. A similar passage (not shown) communicates with chamber 28 and terminates in tubing connection 48 shown on FIG. 1. Either tubing connection may be used as the inlet or outlet connection; the direction of flow not constituting an element of the invention.

Located at the mid area of actuating cylinder housing 16 is a vertical cylinder 50 open at the lower end and terminating at the upper end in a reduced diameter spring cavity 52 and a bore 54 passing through the upper wall of the housing. Axially slidable within cylinder 50 is an actuating piston 56 having a coaxial stem 57 passing through spring cavity 52 and bore 54. A seal ring 58, held in place by washer 59, provides the sealing means between the stem and the housing. A similar seal ring 60, carried by actuating piston 56, prevents blow-by of the actuating gas within cylinder 50. The open end of the cylinder is capped with end plug 62 having a circular boss 63 which engages the cylinder wall and carries seal ring 64. The end plug 62 is joined to housing 16 by a plurality of screws 65. The end plug has an axially threaded passage 66 for receiving the tubing carrying the actuating gas from the solenoid valve as shown on FIG. 5. The axial movement or stroke of the piston, which controls the opening of the valves 18 and 20, may be established by a plurality of thin washers or shims 68 placed between piston 56 and the bottom shoulder of cylinder 50. Contained within spring cavity 52 in a compression spring 70 biasing the piston toward its downward position and valves 18 and 20 to their normally closed positions. As best shown on FIG. 3, the spring cavity 52 has a vent passage 71 to vent any by-passed gas through seal ring 60 on the piston.

The outer end of piston stem 57 terminates in a reduced diameter 72 which is threaded on the end as shown. The reduced diameter 72 passes through the bore at the mid area of cross arm 74 which is held in place by nut 75. The cross arm 74 has two opposing and substantially tapering arms 76, each having a circular boss 77 at the base and terminating in a ball end 78 which engages the transverse circular passage 42 in plug guide 32 as shown on FIG. 2 and FIG. 4.

A bored flange 82, having a circular boss 84 of substantially the same diameter as the circular boss 77 on tapering arm 76, constitutes a portion of valve 20 and is joined to body 24 by means of screws 80 so as to be coaxial with cross arm 74. Between body 24 and the bored flange 82 is a seal 86 to prevent leakage. Coaxial with each tapering arm 76 is a bellows 88 having one end joined in a leakproof manner to circular boss 77 on tapering arm 76 and having the opposite eind joined in like manner to the circular boss 84 on bored flange 82. Although a bellows is shown, other hollow, flexible and leakproof means may be used, as, for example, braided flexible tubing or certain rubber-like or plastic tubes.

The valve as shown and described may be readily assembled, and provides a leakproof valve having utmost simplicity.

It is to be understood that the embodiment of the present invention as shown and described is to be regarded as illustrative only and that the invention is susceptible to variations, modifications, and changes within the scope of the appended claims.

We claim:

1. A leakproof valve for simultaneously controlling two fluid flows and comprising: a housing containing a cylinder, a gas actuated actuating piston operable within said cylinder and having a coaxial stem extending through said housing, a first poppet valve having inlet and outlet connections at one side of said housing, a second poppet valve having inlet and outlet connections on the symmetrically opposite side of said housing, a cross arm joined to the stem extending from said actuating piston and having arms operably joined to said poppet valves, and a hollow flexible sealing member coaxial with each arm on said cross arm and having one end joined to the adjacent poppet valve and the other end joined to said cross arm to provide a flexible leakproof configuration preventing leakage of the fluids passing through said valve.

2. A leakproof valve for simultaneously controlling two fluid flows and comprising: a housing containing a cylinder, a gas actuated actuating piston operable within said cylinder and having a coaxial stem extending through said housing, a first poppet valve having inlet and outlet connections removably mounted on one side of said housing, a second poppet valve having inlet and outlet connections removably mounted on the symmetrically opposite side of said housing, a cross arm joined to the stem extending from said actuating piston and having arms operably joined to said poppet valves, means biasing said poppet valves to the normally closed positions, and a bellows coaxial with each arm on said cross arm and having one end joined to the adjacent poppet valve and the other end joined to said cross arm to provide a flexible leakproof configuration preventing leakage of the fluids passing through said valve.

3. A leakproof valve for simultaneously controlling two fluid flows and comprising: a housing containing a vertical cylinder open at one end, an actuating piston operable within said cylinder and having a coaxial stem extending through a bore in the upper wall of said housing, an end plug over the open end of the cylinder in said housing and having an opening for admitting gas into the cylinder of said housing, a compression spring coaxial with the stem on said piston within said housing and biasing said piston toward said end plug, a first poppet valve having a bore containing an axially movable plug guide with a valve plug on the end adjacent to the seat in the valve body and being removably mounted on one side of said housing, a second poppet valve having a bore containing an axially movable plug guide with a valve plug on the end adjacent to the seat in the valve body and being removably and symmetrically mounted on the opposite side of said housing, both said first and said second valves having inlet and outlet connections and being so mounted that the movement of the plug guide in each of said valves is parallel to the movement of said piston in said housing, a cross arm joined to the extended end of the stem on said piston and having arms engaging the plug guide in each of said valves, and a bellows coaxial with each arm of said cross arm and having one end joined to one of said valves and the other end joined to said cross arm to provide a flexible leakproof configuration preventing leakage of the fluids passing through said valve.

4. A leakproof valve for simultaneously controlling two fluid flows and comprising: a housing containing a vertical cylinder open at the lower end of said housing and terminating at the upper end in a coaxial spring cavity and a bore passing through the upper wall of said housing, an actuating piston operable within said cylinder and having an upwardly extending stem extending outwardly through the bore in said housing, an end plug capping the open end of the cylinder in said housing and having an opening for admitting gas into the cylinder portion below said piston, a compression spring within the spjring cavity of said housing and biasing said piston toward said end plug, a first poppet valve removably mounted on one side of said housing, a second poppet valve removably and symmetrically mounted on the opposite side of said housing; each of said poppet valves having a body containing an inlet connection, an outlet connection on a bore terminating in a valve seat in the flow passage between the inlet and outlet connection, a plug guide axially slidable in said bore and having a passage therethrough transverse to the longitudinal axis of the plug guide, a valve plug joined to the lower end of said plug guide for opening from and closing against said seat, and a compression spring within said bore above said plug guide and biasing said valve plug against said seat, said first and said second valves being so mounted that the movement of the plug guide in each of said valves is parallel to the movement of said actuating piston in said housing; a cross arm transversely joined to the extended end of the stem on said actuating piston and having arms terminating in ball ends each engaging the transverse passage through the plug guide of said valves and a bellows coaxial with each arm of said cross arm and having one end joined to one of said valves and the other end joined to said cross arm to provide a flexible leakproof configuration preventing leakage of the fluids passing through said valve.

References Cited in the file of this patent

UNITED STATES PATENTS

| | | |
|---|---|---|
| 1,551,651 | Everhart | Sept. 1, 1925 |
| 2,145,575 | Zwickl | Jan. 31, 1939 |
| 3,028,963 | Rose | Apr. 10, 1962 |

FOREIGN PATENTS

| | | |
|---|---|---|
| 1,114,452 | Germany | Oct. 5, 1961 |